United States Patent
Choudhary et al.

(10) Patent No.: US 9,369,880 B2
(45) Date of Patent: Jun. 14, 2016

(54) SYSTEM AND METHOD FOR TRANSMISSION ADAPTION TO AVOID RECEPTION INTERFERENCE IN A DEVICE THAT IMPLEMENTS MORE THAN ONE WIRELESS TECHNOLOGY

(71) Applicant: Broadcom Corporation, Irvine, CA (US)

(72) Inventors: Amit Choudhary, Bangalore (IN); Arzad Kherani, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 151 days.

(21) Appl. No.: 14/041,862

(22) Filed: Sep. 30, 2013

(65) Prior Publication Data

US 2015/0092675 A1    Apr. 2, 2015

(51) Int. Cl.
| | |
|---|---|
| *H04W 72/10* | (2009.01) |
| *H04W 16/14* | (2009.01) |
| *H04W 48/00* | (2009.01) |
| *H04W 88/06* | (2009.01) |
| *H04W 72/12* | (2009.01) |

(52) U.S. Cl.
CPC .............. *H04W 16/14* (2013.01); *H04W 48/00* (2013.01); *H04W 72/1215* (2013.01); *H04W 88/06* (2013.01)

(58) Field of Classification Search
CPC .............................. H04W 88/06; H04W 48/00
See application file for complete search history.

(56) References Cited

U.S. PATENT DOCUMENTS

| | | | |
|---|---|---|---|
| 2012/0275362 A1* | 11/2012 | Park et al. ............ | 370/311 |
| 2014/0226613 A1* | 8/2014 | Kim et al. ............ | 370/329 |

OTHER PUBLICATIONS

Cheng, Jung-Fu, et al. "Error Detection Reliability of LTE CRC Coding", Vehicular Technology Conference, Sep. 21-24, 2008; 5 pages.

"Long Term Evolution Protocol Overview", Freescale Semiconductor, white paper, Oct. 2008; 21 pages.

"$3^{rd}$ Genereation Partnership Project: Technical Specification Radio Access Network; Evolved Universal Terrestrial Radio Access (E-UTRA); Physical Channels and Modulation (Release 8)", 3GPP TS 36.211 V8.9.0, Dec. 2009; 83 pages.

"$3^{rd}$ Generation Partnership Project: Technical Specification Group Radio Access Network; Evolved Universal Terrestrial Radio Access (E-UTRA); Multiplexing and channel coding (Release 8)", 3GPP TS 36.212 V8.8.0, Dec. 2009; 60 pages.

Rayal, Frank, "LTE Physical Layer Overview—Part III", EE Times, Jul. 22, 2010; 5 pages.

"LTE in a Nutshell: The Physical Layer", Telesystem Innovations, Inc., white paper, 2010; 18 pages.

"$3^{rd}$ Generation Partnership Project: Technical Specification Group Radio Access Network; Evolved Universal Terrestrial Radio Access (E-UTRA); Study on signaling and procedure for interference avoidance for in-device coexistence (Release 11)", 3GPP TS 36.816 V11.2.0, Dec. 2011; 44 pages.

"TTI Bundling in FDD and TD-LTE", LTE University, Aug. 13, 2012, http://lteuniversity.com/get_trained/expert_opinionl/b/sekhar/archive/2012/08/13/tti-bundling-in-fdd-and-td-lte.aspx (last accessed Nov. 26, 2013; 4 pages.

"3 GPP LTE: Dynamic Scheduling, Persistent Scheduling and Semi Persistent Scheduling", Wireless Communication & DSP, July 11, 2013, http://communicationanddsp.blogspot.in/2013/07/3gpp-lte-dynamic-scheduling-persistent.html (last accessed Nov. 26, 2013); 2 pages.

\* cited by examiner

*Primary Examiner* — John Blanton
(74) *Attorney, Agent, or Firm* — Sterne, Kessler, Goldstein & Fox P.L.L.C.

(57) ABSTRACT

Example embodiments generally relate to adapting a transmission via first wireless technology to avoid interference with a reception via a second wireless technology. For example, a user equipment (e.g. cell phone) can include radios operating according to first and second wireless radio technologies, which can include Long Term Evolution (LTE) and a technology using the industrial, scientific and medical (ISM) frequency band. When a priority request is asserted by a radio operating in the ISM frequency band, the LTE radio may abort a scheduled transmission when certain "transmission abort criteria" are satisfied.

15 Claims, 11 Drawing Sheets

SYSTEM AND METHOD FOR TRANSMISSION ADAPTION TO AVOID RECEPTION INTERFERENCE IN A DEVICE THAT IMPLEMENTS MORE THAN ONE WIRELESS TECHNOLOGY

BACKGROUND OF THE DISCLOSURE

1. Field of the Disclosure

Example embodiments generally relate to adapting a transmission via first wireless technology to avoid interference with a reception via a second wireless technology.

2. Background

A mobile device may be capable of communicating using more than one wireless technology. When operated concurrently, certain radio technologies within such a device may operate on frequencies that cause interference. For example, wireless communications conforming to the 3rd Generation Partnership Project's (3GPP) long-term evolution (LTE) specification may operate on frequencies near or adjacent to an industrial, scientific and medical (ISM) frequency band. So, interference may result between LTE communication and communication from a technology operating in the ISM band in a device that implements both technologies. To reduce or eliminate interference, co-existence coordination may be required to schedule transmission and reception among co-existing radio technologies, while avoiding performance degradation in the co-existing radio technologies.

DETAILED DESCRIPTION OF EXAMPLE EMBODIMENTS

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Software described throughout this disclosure may be embodied as one or more computer-readable instruction(s) on a computer-readable storage device that is tangible—such as a persistent memory device (e.g., read-only memory (ROM), flash memory, a magnetic storage device, an optical disc, and the like), a non-persistent memory device (e.g., random-access, memory (RAM)), and the like—that can be executed by a processor to perform one or more operations.

Figure 1:
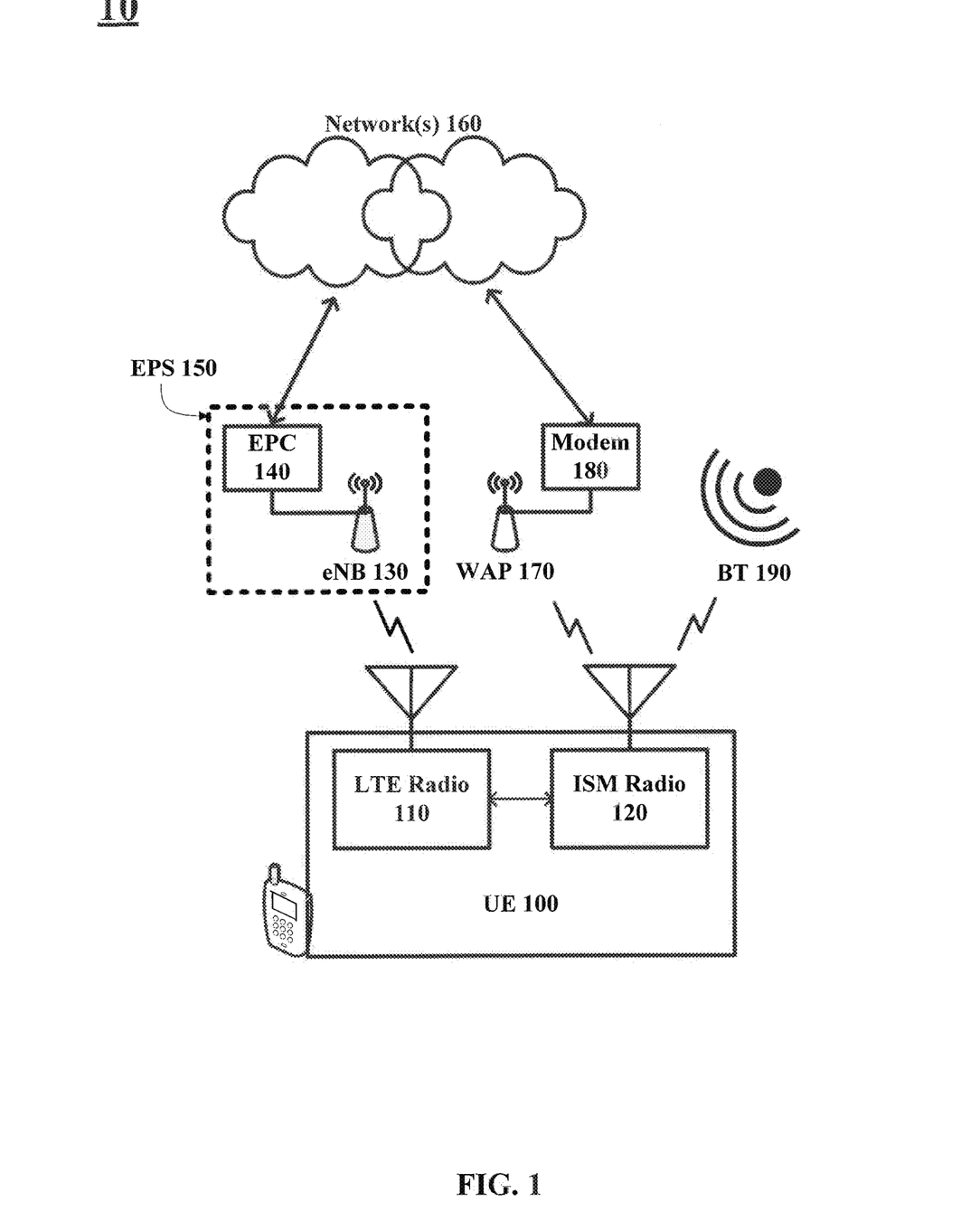
FIG. 1 illustrates an example communications system, which includes an apparatus that is capable of communicating via more than one wireless technology.

Turning now to FIG. 1, an example communications system 10, which includes an apparatus (UE 100) that is capable of communicating via more than one wireless technology, is shown. The user equipment (UE) 100 of FIG. 1 may be any device that that is capable of communicating via more than one wireless technology and supports co-existing wireless communications. Examples of the UE 100 include (but are not limited to) a mobile computing device—such as a laptop computer, a tablet computer, a mobile telephone or smartphone, a "phablet," a personal digital assistant (PDA), and the like; a wearable computing device—such as a computerized wrist watch or "smart" watch, computerized eyeglasses, and the like; and a stationary computing device—such as a personal computer (PC), a desktop computer, a computerized kiosk, and the like.

As shown in FIG. 1, the UE 100 includes a radio transceiver that is configured for communications conforming to the 3GPP's LTE specification (i.e., LTE radio 110), and a radio transceiver that is configured for communications via a technology that operates over an industrial, scientific and medical (ISM) frequency band (i.e., ISM radio 120). The ISM radio 120 may implement any technology that operates in the ISM frequency band, such as (but not limited to) Wi-Fi (i.e., the Institute of Electrical and Electronics Engineers' (IEEE) 802.11 standards), Bluetooth, and the like. In one embodiment, the ISM radio 120 represents a device, integrated circuit, chip, etc., that implements more than one technology operating in the ISM frequency band, e.g., Wi-Fi and Bluetooth. While not shown, the UE 100 of FIG. 1 may include one or more additional radio transceivers. For example, the UE 100 may also include a radio transceiver that is configured for communications with a global navigation satellite system (GNSS), such as the global positioning system (GPS). Each radio transceiver of the UE 100 may be implemented in hardware, software, or any combination of hardware and software.

Figure 2:
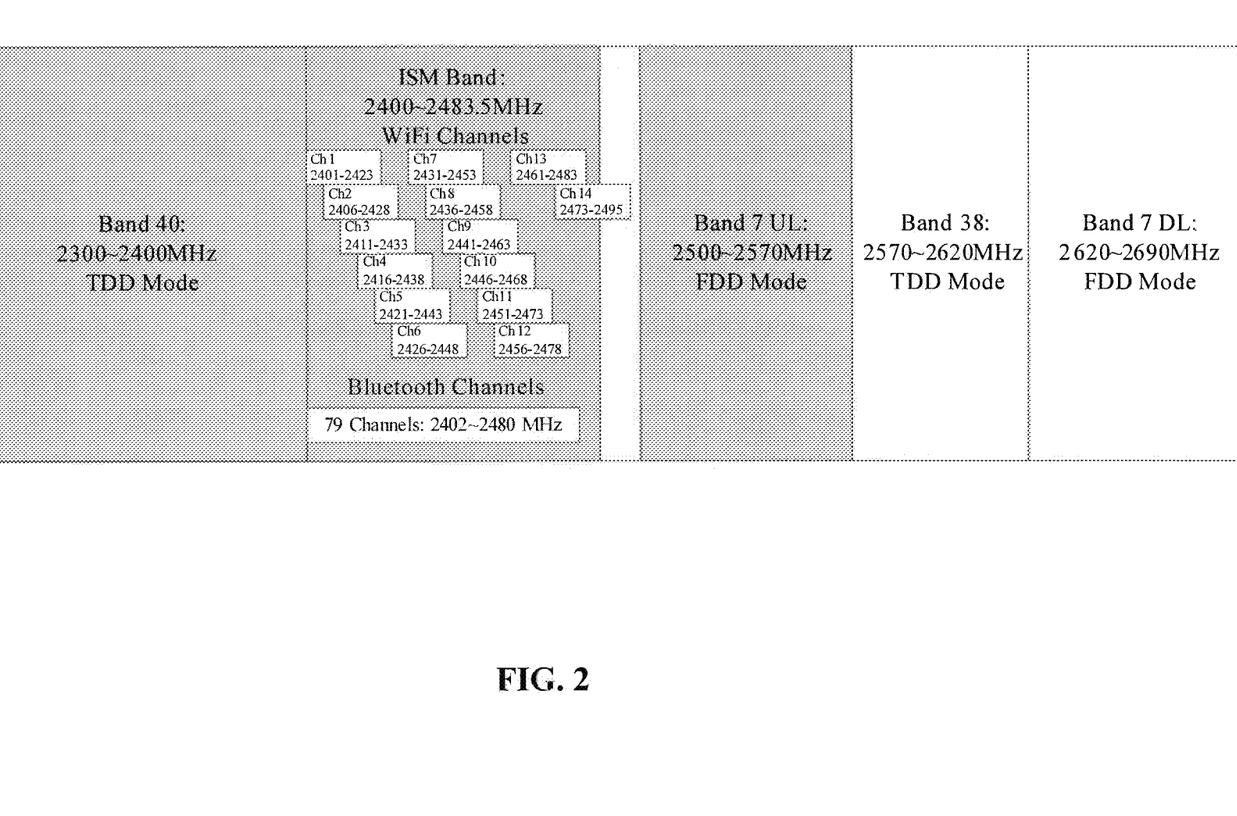
FIG. 2 illustrates example frequency bands for wireless communications.

The LTE radio 110 and the ISM radio 120 may operate on adjacent or nearly adjacent frequencies. FIG. 2 illustrates this scenario—the LTE radio 110 may operate in "band 40" (2300~2400 MHz) and "band 7 UL" (2500~2570 MHz), and the ISM radio may operate in the 2400~2483.5 MHz frequency range. As shown in FIG. 2, Wi-Fi and Bluetooth may operate in the ISM radio band, adjacent or nearly adjacent to the LTE bands. In some situations, without co-existence coordination, concurrent operation of the LTE radio 110 and the ISM radio 120 may cause interference with each other.

Returning to FIG. 1, the LTE radio 110 supports communications with the evolved packet system (EPS) 150. The EPS 150 of FIG. 1 comprises an evolved packet core (EPC) 140 together with an evolved radio access network (evolved universal terrestrial radio access (E-UTRA) and evolved universal terrestrial radio access network (E-UTRAN)). The EPC 140 is the core network architecture of the LTE system, and is a packet-switched architecture that relies on Internet Protocol (IP) to transport services. The EPC 140 is connected to the external network 160, which may include one or more packet data networks (PDN), such as (but not limited to) an Internet protocol (IP) Multimedia Core Network Subsystem (IMS) and the Internet. In one example, the EPC 140 transports a voice over LTE (VoLTE) service provided by an IMS to the UE 100. In another example, the EPC 140 transports Email, video streaming, web browsing, and like services provided by the Internet to the UE 100.

The evolved radio access network of the EPS 150 of FIG. 1 includes the eNodeB (eNB) 130, which may be one of a plurality of base stations that are networked together to form the E-UTRAN. A person skilled in the art would understand that the EPS 150 is not limited to a single base station as illustrated in FIG. 1, but may include any number of eNBs. Each eNB of the EPS 150, including the eNB 130, is connected to an EPC, such as EPC 140. The UE 100 illustrated in FIG. 1 may access (via the LTE radio 110) the eNB 130 to connect to the EPC 140. Because the EPC 140 is connected to the external network 160, the UE 100 can access services provided by the external network 160 through the EPS 150.

The ISM radio 120 may implement any technology, specification, or standard that operates in the ISM frequency band. In the example system 10 of FIG. 1, the ISM radio 120 may communicate with a wireless access point (WAP) 170, and/or a Bluetooth device (BT) 190. The WAP 170 may be associated with a wireless local area network (WLAN), and may implement Wi-Fi technology. The WAP 170 may be included in, or be communicatively connected to, a modem 180 or any other mechanism that allows the UE 100 to connect to and communicate with the external network 160 via the WAP 170. In the example system 10 of FIG. 1, Wi-Fi and Bluetooth may operate in the ISM frequency band (refer to FIG. 2).

Figure 3:
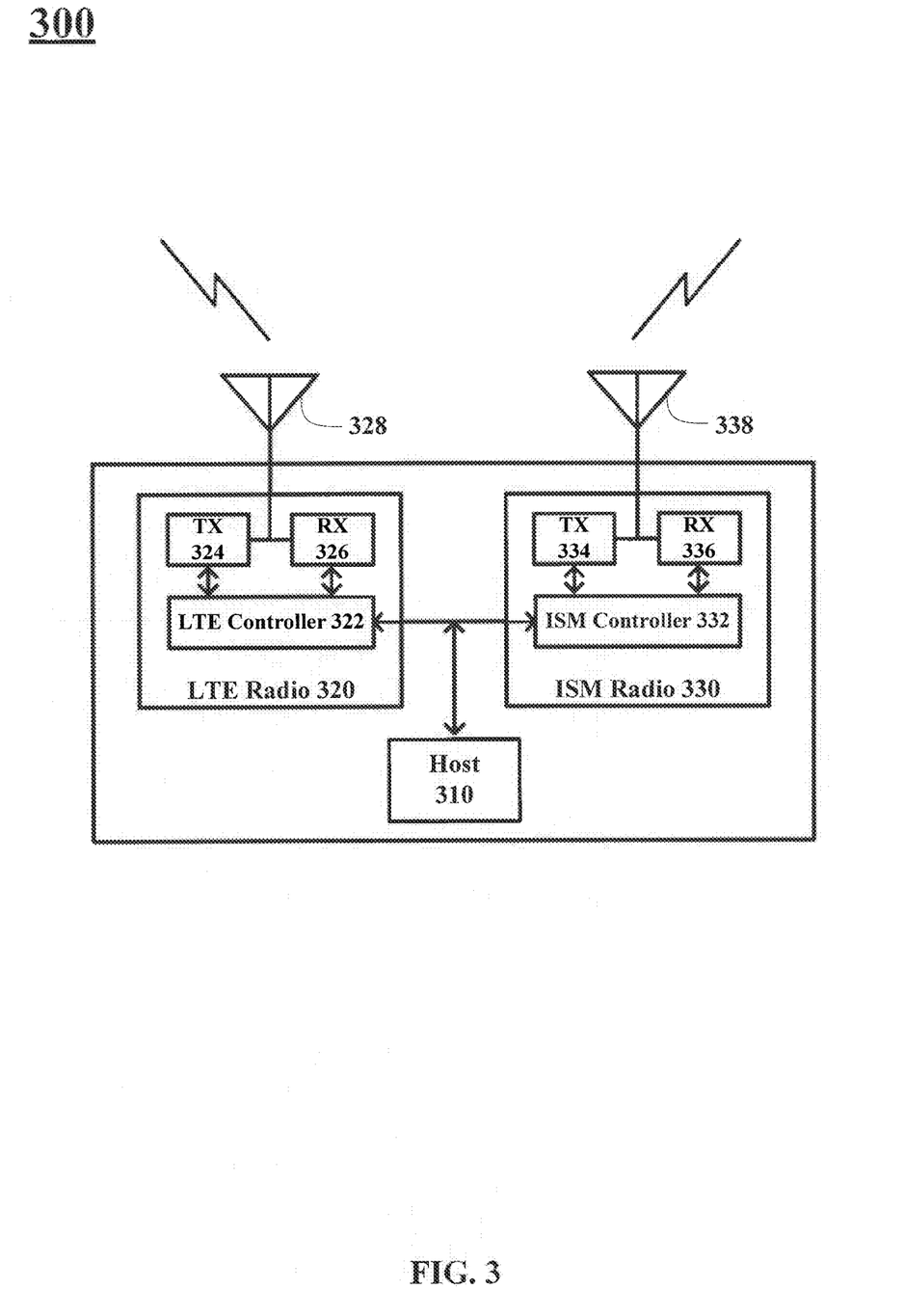
FIG. 3 illustrates an example apparatus that is capable of communicating via more than one wireless technology.

Turning to FIG. 3, an example apparatus 300 that is capable of communicating via more than one wireless technology is illustrated. The apparatus 300 can be a UE with two radio, and can be an example of UE 100. The apparatus 300 includes a host processor 310, a LTE radio 320, and an ISM radio 330. While only two radios are depicted in FIG. 3, the apparatus 300 may include more than two radios, as will be understood by those skilled in the arts. A person skilled in the art would understand that the apparatus 300 may include one or more components (e.g., implemented in hardware, software, or any combination of hardware and software) in addition to the components shown in the embodiment of FIG. 3 without departing from the scope of this disclosure. For example, the apparatus 300 may include an input device for accepting user input; an output device to present aural, visual, and/or tactile output; a memory system for storing data and executable code (e.g., one or more applications); a power source (e.g., a battery); various interfaces for connecting other devices (e.g., a peripheral device); and any other component known to a person skilled in the art.

Some or all of the components of the apparatus 300 may be implemented as a single integrated circuit, or may be implemented as different integrated circuits that are communicatively connected (e.g., via wires or wirelessly). In one example, the host 310, the LTE radio 320, and the ISM radio 330 are implemented as a single integrated circuit. In another example, the host 310, the LTE radio 320, and the ISM radio 330 are each implemented as separate integrated circuits. Separate integrated circuits may be mounted on a printed circuit board (PCB) along with other circuits, devices, components, and the like. All other configurations apparent to a person skilled in the art are within the scope of this disclosure.

The apparatus 300 of FIG. 3 may support co existing wireless communications. Via the radios 320 and 330, the apparatus 300 may establish co-existing connections and concurrently communicate via more than one wireless technology. In one example, the LTE radio 320 exchanges communications over an EPS (e.g., EPS 150 of FIG. 1) while the ISM radio 330 exchanges communications with a Wi-Fi WAP (e.g., WAP 170 of FIG. 1). In another example, the LTE radio 320 exchanges communications over an EPS while the ISM radio 330 exchanges communications with a Bluetooth device (e.g., BT 190 of FIG. 1). In yet another example, the LTE radio 320 exchanges communications over an EPS while the ISM radio 330 exchanges communications with a Wi-Fi-enabled device and a Bluetooth-enabled device. Again, all other configurations apparent to a person skilled in the art are within the scope of this disclosure.

As mentioned, the apparatus 300 includes the host 310. The host 310 is communicatively connected to the LTE radio 220 and the ISM radio 230. The host 310 may control the overall operation of the apparatus 300, and may include (but is not limited to) one or more: central processing units (CPU), field programmable gate arrays (FPGA), application specific integrated circuits (ASIC), digital signal processors (DSP), and the like. The host 310 may execute one or more applications, such as an operating system (OS), to control the overall operation of the apparatus 300, and to manage co-existing wireless connections in accordance with example embodiments of this disclosure. The host 310 may include one or more components (e.g., implemented in hardware, software, or any combination of hardware and software) in addition to the components shown in the embodiment of FIG. 3 without departing from the scope of this disclosure.

The LTE radio 320 includes a LTE controller 322, a transmitter (TX) 324, a receiver (RX) 326, and an antenna 328. The LTE controller 322 is communicatively connected to both of the TX 324 and the RX 326 for control and data transmission and reception. The LTE controller 322 is also communicatively connected to the ISM controller 332 of the ISM radio 330, and can exchange data or other communications with the ISM controller 332. The antenna 328, which transmits and receives electromagnetic radiation, is communicatively connected to both of the TX 324 and the RX 326. In FIG. 3, the antenna 328 may represent one or more antennas—e.g., the antenna 328 may represent a multiple-input and multiple-output (MIMO) structure.

The LTE radio 320 may include one or more components (e.g., implemented in hardware, software, or any combination of hardware and software) in addition to the components shown in the embodiment of FIG. 3 without departing from the scope of this disclosure. And, some or all of the components of the LTE radio 320 may be implemented as a single integrated circuit, or may be implemented as different integrated circuits that are communicatively connected (e.g., via wires or wirelessly).

One or more components of the apparatus 300, such as the LTE radio 320, may implement the protocol stack defined by the 3GPP's LTE specification to enable communication with a LTE network. Regarding the physical layer of the LTE protocol stack, the 3GPP's LTE specification defines three physical channels for the uplink, i.e., from LTE-enabled device to LTE network. The three physical channels are: the physical uplink shared channel (PUSCH), which may carry user data and certain control information; the physical random access channel (PRACH), which may be used to synchronize with an eNodeB of a LTE network (e.g., the eNB 130 of FIG. 1); and the physical uplink control channel (PUCCH), which may carry control information. The TX 324 of the LTE radio 320 may transmit communications associated with these uplink physical channels, as well as other communications—such as a sounding reference, signal (SRS). A SRS transmission may be used by the LTE network for uplink channel quality estimation that is determined based on the SRS sent from the LTE radio 320. Example embodiments of this disclosure describe techniques for adapting LTE PUSCH, PUCCH, and SRS transmission in order to avoid interference with concurrent ISM reception, e.g. reception at the ISM radio 330 of the apparatus 300.

Still considering the physical layer of the LTE protocol stack, the 3GPP's LTE specification defines several physical channels for the downlink, i.e., from LTE network to LTE-enabled device. Examples include: the physical broadcast channel (PBCH); the physical downlink shared channel (PDSCH), which may carry data from a LTE network to a LTE-enabled device; the physical multicast channel (PMCH); the physical downlink control channel (PDCCH), which may carry certain control information from a LTE network to a LTE-enabled device; the physical control format indicator channel (PCFICH); and the physical hybrid ARQ indicator channel (PHICH). The RX 326 of the LTE radio 320 may receive communications associated with these downlink physical channels, as well as other communications, that are provided to the LTE controller 322 after down-conversion and any necessary demodulation.

The ISM radio 330 includes an ISM controller 332, a transmitter (TX) 334, a receiver (RX) 336, and an antenna 338. The ISM controller 332 is communicatively connected to both of the TX 334 and the RX 336. The ISM controller 332 is also communicatively connected to the LTE controller 322 of the LTE radio 320, and can exchange data or other communications with the LTE controller 322. The antenna 338, which transmits and receives electromagnetic radiation, is communicatively connected to both of the TX 334 and the RX 336. In FIG. 3, the antenna 338 may represent one or more antennas—e.g., the antenna 338 may represent a multiple-input and multiple-output (MIMO) structure.

The ISM radio 330 may include one or more components (e.g., implemented in hardware, software, or any combination of hardware and software) in addition to the components shown in the embodiment of FIG. 3 without departing from the scope of this disclosure. And, some or all of the components of the ISM radio 330 may be implemented as a single integrated circuit, or may be implemented as different integrated circuits that are communicatively connected (e.g., via wires or wirelessly).

The apparatus 300 may adapt a transmission from the LTE radio 320 to avoid interference with a reception at the ISM radio 330, or vice versa. For example, during concurrent operation of the LTE radio 320 and the ISM radio 330, the ISM radio 330 may assert or request ISM reception priority (ISM_RX_PRIORITY) when ISM reception is scheduled. The terms "assert" and "request" may be used interchangeably throughout this disclosure—so "asserting" priority may function as "requesting" priority, and vice versa. ISM reception priority may be de-asserted when the scheduled ISM reception has completed. ISM reception may be scheduled by the ISM radio 330 (e.g., via the ISM controller 332), the host 310, or another mechanism of the apparatus 300. And, ISM reception priority may be asserted and de-asserted by the ISM radio 330 (e.g., via the ISM controller 332), the host 310, or another mechanism of the apparatus 300.

Continuing this example, the LTE radio 320 (e.g., via the LTE controller 322) may determine—e.g., by receiving a communication indicating assertion of ISM reception priority; or by periodically polling the ISM radio 330, the host 310, or another mechanism (e.g., a flag register) of the apparatus 300—when ISM reception priority has been asserted and when ISM reception priority has been de-asserted. Once the LTE radio 320 determines that ISM reception priority is asserted, it may adapt a LTE transmission, under certain circumstances, to avoid interference with the scheduled ISM reception. The ISM radio 330 (e.g., via the ISM controller 332), the host 310, or another mechanism may send a communication indicating the assertion of ISM reception priority to the LTE radio 320 (e.g., to the LTE controller 322).

Still considering this example, the circumstances under which a LTE transmission is adapted may be determined by considering or analyzing one or more factors or criteria, such as device configuration, network configuring, whether one or more thresholds, tolerances, etc. have been exceeded, and the like. The example methods illustrated in FIGS. 4-9 (i.e., FIGS. 4A, 4B, 5A, 5B, 6, 7, 8, and 9) provide additional examples. The LTE radio 320 (e.g., via the LTE controller 322), the host 310, or another mechanism of the apparatus 300 may consider or analyze the one or more factors of criteria, and determine whether to adapt a LTE transmission. Because satisfaction of the criteria for adapting a transmission may result in aborting the transmission, the criteria may be referred to as "transmission abort criteria." Any aborted transmission may be retransmitted at a later time, such as after ISM reception priority has been de-asserted. Additionally, a scheduled reception (e.g., ISM reception) may be received after aborting a transmission (e.g., LTE transmission). Using techniques for co-existence coordination, such as those described herein, the apparatus 300 may reduce or eliminate ISM reception interference while avoiding degradation of the LTE uplink performance when the LTE radio 320 and the ISM radio 330 concurrently operate.

FIGS. 4-9 (i.e., FIGS. 4A, 4B, 5A, 5B, 6, 7, 8, and 9) illustrate example methods for adapting a transmission via a first wireless technology to avoid interference with a reception via a second wireless technology. These methods may be applicable to both time division duplex (TDD) and frequency division duplex (FDD). One, more than one, or all of these example methods may be implemented by any device or apparatus that is capable of communicating via more than one wireless technology, such as the UE 100 of FIG. 1 or the apparatus 300 of FIG. 3. Additionally, for each of the example methods, each stage of a method may represent a computer-readable instruction stored on a computer-readable storage device, which when executed by a processor causes the processor to perform one or more operations.

Figure 4A:
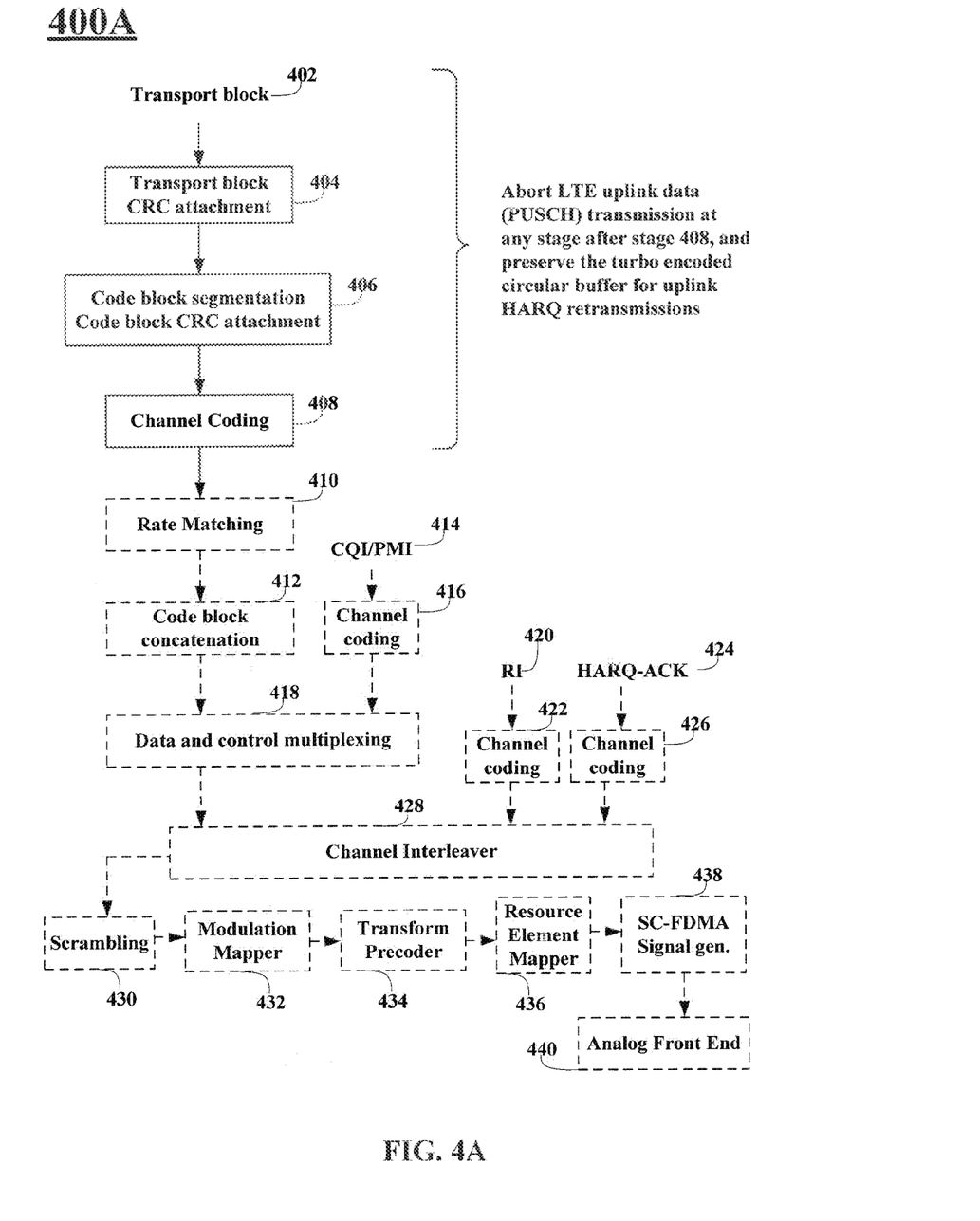
FIG. 4A illustrates an example method for co-existence coordination between LTE data PUSCH transmission and ISM reception.
Figure 4B:
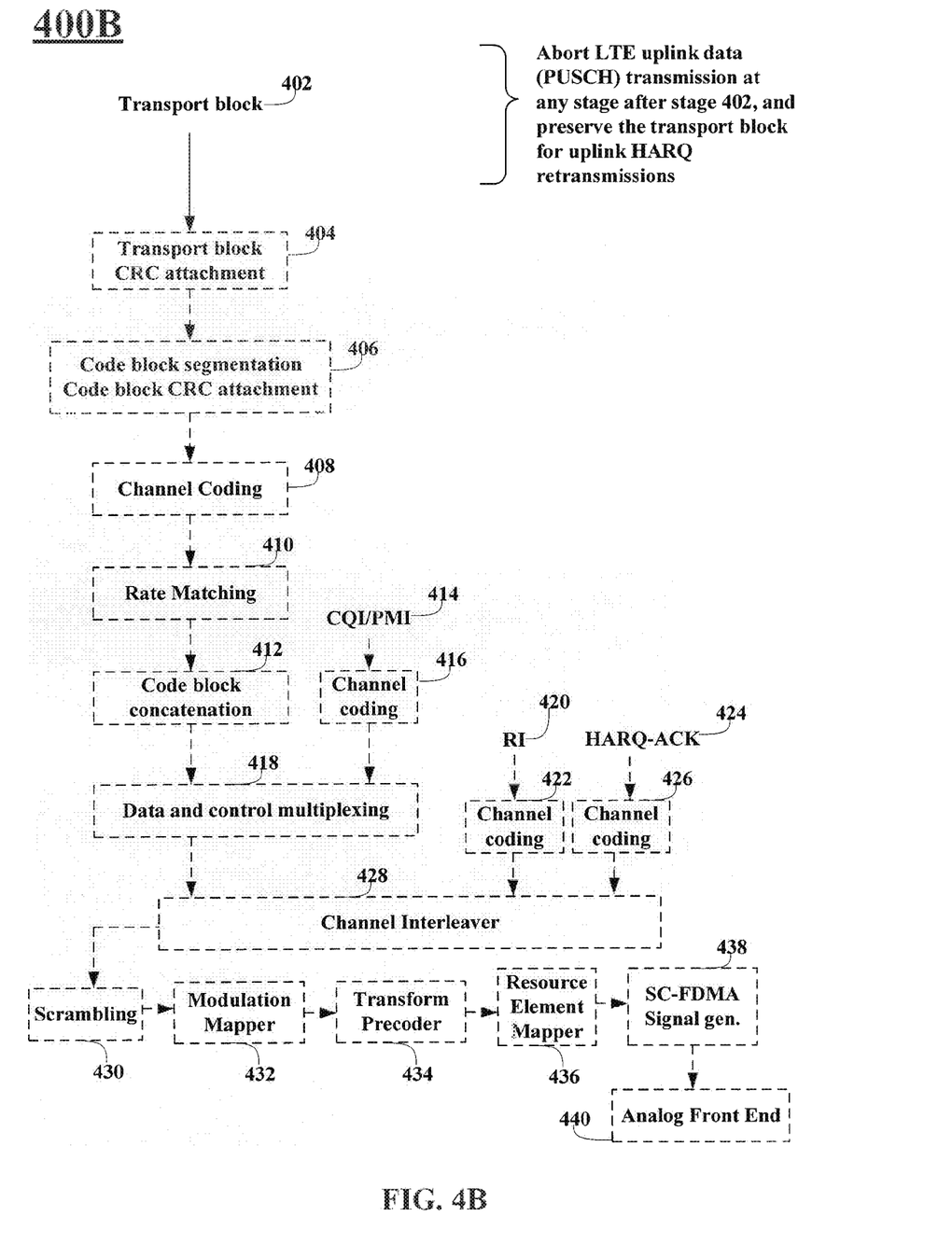
FIG. 4B illustrates an example method for co-existence coordination between LTE data PUSCH transmission and ISM reception.

FIGS. 4A and 4B illustrate example methods, for co-existence coordination between LTE data PUSCH transmission and ISM reception. In these example methods, a LTE radio and a radio that implements a technology operating in the ISM frequency band concurrently operate. Here, a scheduled ISM reception may be indicated to the LTE-side (e.g., a LTE radio, or a processor that can control operation of a LTE radio, or both), which may decide to abort a LTE data PUSCH transmission that would interfere with the scheduled ISM reception. The LTE-side may be notified of the scheduled ISM reception by asserting ISM reception priority, as described above. After, the LTE data PUSCH transmission is aborted, it may be followed by a non-adaptive retransmission, unless the non-adaptive retransmission is overridden by an explicit uplink grant from the LTE network (e.g., the EPS 150 of FIG. 1) for an initial transmission or for an adaptive retransmission.

FIG. 4A illustrates an example method 400A for HARQ-enabled abort of a LTE data PUSCH transmission (HARQ: hybrid automatic repeat request). The example method 400A may be performed by a LTE radio (e.g., the LTE radio 320 including controller 322 of FIG. 3), a processor (e.g., the host 310 of FIG. 3), or a combination of components (e.g., a LTE radio and a processor). In FIG. 4A, data arrives for processing in the form of a "Transport block" 402, which is the basic data unit exchanged between the physical layer (PHY) and the media access control layer (MAC) in the LTE protocol stack. One transport block may arrive for every transmission time interval (TTI). At stage 404 ("Transport block CRC attachment"), a cyclic redundancy check (CRC) is added to the transport block. CRC attachment may provide error detection on the transport block. After CRC attachment to the transport block, the method 400A advances to stage 406 ("Code block segmentation" and "Code block CRC attachment") where the transport block may be divided into two or more code blocks (code block segmentation), and a CRC may be added to each code block (code block CRC attachment). At stage 408 ("Channel Coding"), each of the code blocks may be individually turbo encoded. After stage 408, a turbo encoded circular buffer, which may be used for LTE uplink HARQ retransmission, is available.

The method 400A next advances to stage 410 ("Rate Matching"), where each code block may be individually rate matched. Rate matching may ensure that the amount of data to be transmitted matches an amount of bandwidth that is available for transmission. At stage 412 ("Code block concatenation"), the code blocks are linked together (i.e., concatenated). At stage 416, control information in the form of channel quality information and/or precoding matrix indicator ("CQI/PMI") 414 is encoded with channel coding. At stage 418, the concatenated data code blocks from stage 412 and the encoded control information from step 416 are multiplexed together, and then the method 400A advances to stage 428 ("Channel Interleaver").

At stage 422 control data in the form of rank indication 420 ("RI") is channel encoded, and stage 426 control data in the form of HARQ-ACK 424 is channel encoded. The result of the data and control multiplexing, along with the results of encoding control data in the form of rank indication and HARQ-ACK, is input to a channel interleaver at stage 428. At stage 428, the channel interleaver may implement a time-first mapping of modulation symbols onto the transmit waveform, and may ensure that the HARQ-ACK information is present on both slots in the subframe and is mapped to resources around the uplink demodulation reference signals.

The output of the channel interleaver is scrambled at stage 430 ("Scrambling"), and then sent to stage 432 ("Modulation Mapper"). The modulation mapper, may perform modulation of scrambled bits to generate complex-valued symbols. At stage 434 ("Transform Precoder"), the complex-valued symbols may be subjected to transform procoding. At stage 436 ("Resource Element Mapper"), the complex-valued symbols may be mapped to resource elements. Next, the method 400A advances to stage 438 ("SC-FDMA Signal gen."), where a complex-valued time-domain single-carrier frequency-division multiple access (SC-FDMA) signal may be generated for each antenna port, and subsequently input to the analog front end at stage 440 ("Analog Front End").

In the method 400A of FIG. 4A, a LTE data PUSCH transmission may be aborted at any stage after stage 408. Here, the turbo encoded circular buffer, which is available after stage 408, may be preserved for subsequent retransmission, e.g., uplink HARQ retransmission. The turbo encoded circular buffer may be stored in a memory device. Because the turbo encoded circular buffer is used for LTE uplink HARQ retransmission, aborting a LTE data PUSCH transmission after stage 408 of the method 400A may result in retransmission occurring naturally and without the need for special handling.

FIG. 4B illustrates an example method 400B for HARQ-enabled abort of a LTE data PUSCH transmission. The example method 400B may be performed by a LTE radio (e.g., the LTE radio 320 including the LTE controller 322 of FIG. 3), a processor (e.g., the host 310 of FIG. 3), or a combination of components (e.g., a LTE radio and a processor). The example method 400B of FIG. 4B includes the same stages as the method 400A of FIG. 4, and therefore explanation of the stages 402-440 of FIG. 4B will not be repeated. However, in the method 400B of FIG. 4B, a LTE data PUSCH transmission may be aborted at any stage after the transport block arrives at stage 402. In this case, the transport block may be preserved for subsequent retransmission, e.g., uplink HARQ retransmission. The transport block may be stored in a memory device.

Figure 5A:
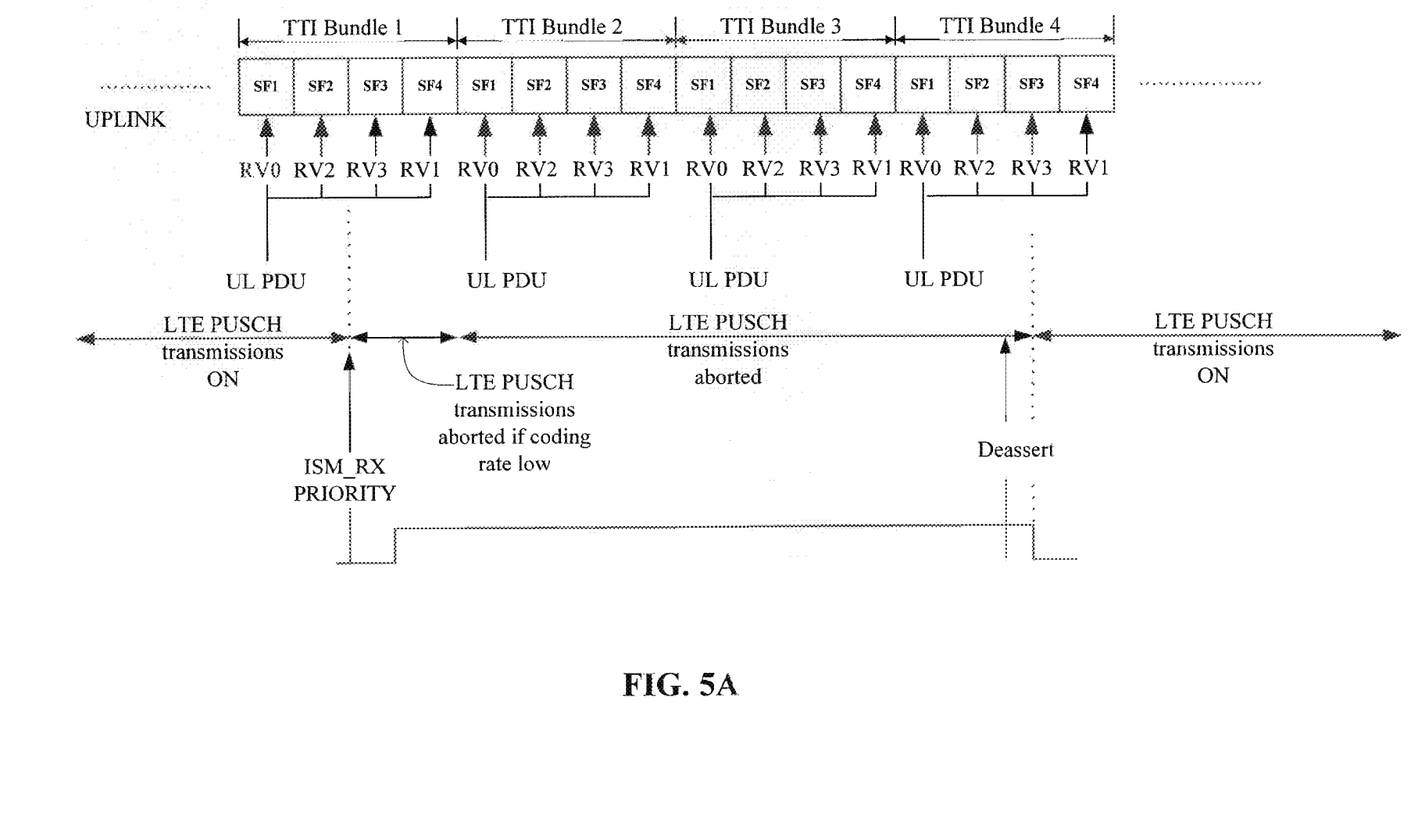
FIG. 5A illustrates an example timing diagram for co-existence coordination between LTE data PUSCH transmission when TTI bundling is enabled and ISM reception.
Figure 5B:
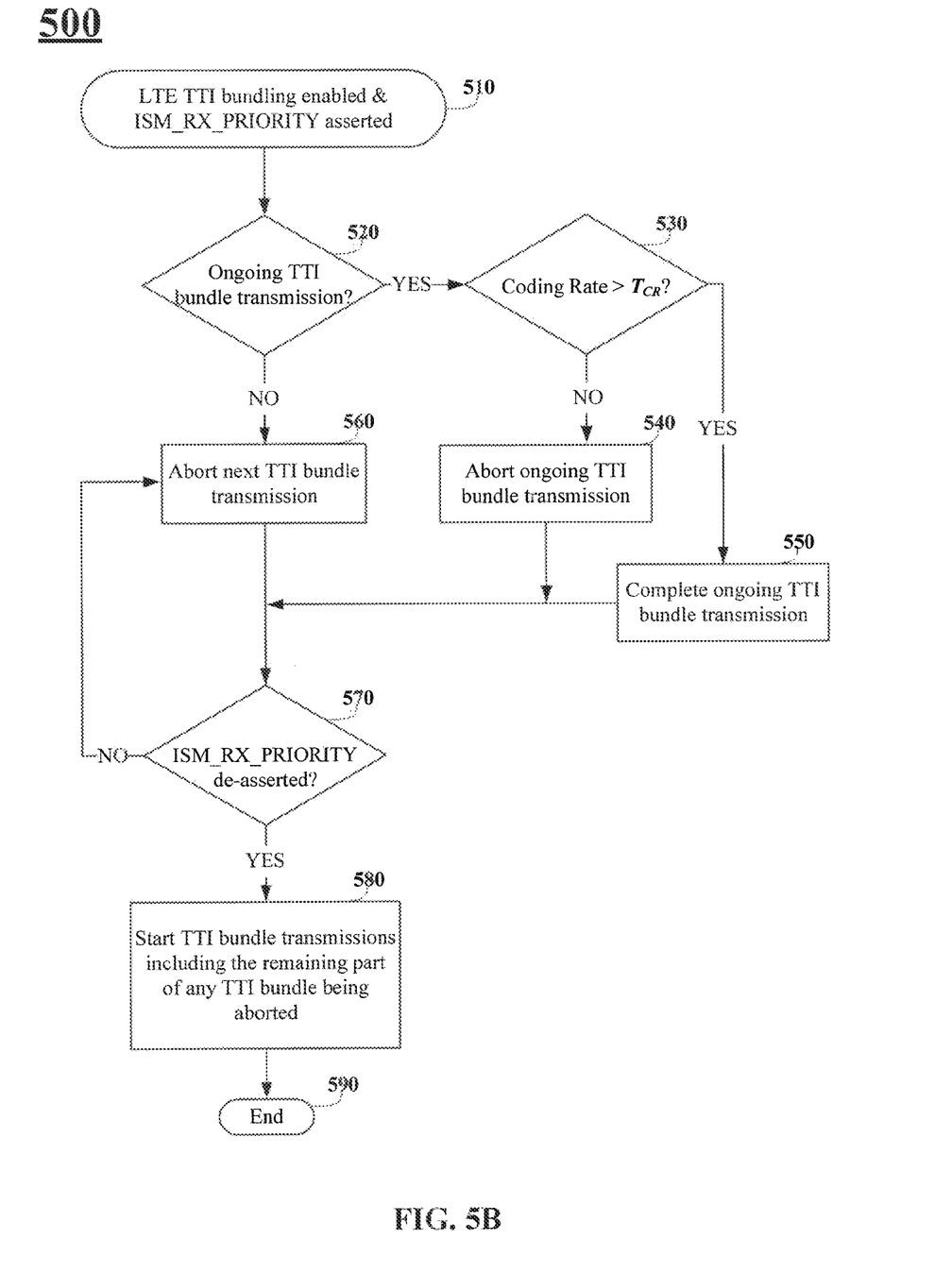
FIG. 5B illustrates an example method for co-existence coordination between LTE data PUSCH transmission when TTI bundling is enabled and ISM reception.

Turning now to FIGS. 5A and 5B, a LTE-enabled device that is capable of communicating via more than one wireless technology (e.g., the UE 100 of FIG. 1 or the apparatus 300 of FIG. 3) may be configured to perform transmission time interval (TTI) bundling. TTI bundling is a technique that may improve uplink coverage, cell edge performance, or the like, by transmitting LTE data (PUSCH) in bundles of multiple subframes for every uplink grant or together with higher coding rate transmissions. I FIG. 5A illustrates an example timing diagram for co-existence coordination between LTE data PUSH transmission when TTI bundling is enabled and ISM reception. FIG. 5A shows four TTI bundles—TTI Bundle 1, TTI Bundle 2, TTI Bundle 3, and TTI Bundle 4. Each of the four TTI bundles shown in FIG. 5A includes four subframes (e.g., SF1-SF4 of TTI Bundle 1). The four subframes of a TTI bundle may be transmitted from a UE to a LTE network (e.g., the EPS 150 of FIG. 1) consecutively, and without waiting for a HARQ ACK/NACK message from the LTE network.

As further illustrated in FIG. SA, each of the four subframes in a TTI bundle may be a redundancy version (RV) of the same transport block—thus, in TTI Bundle 1: RV0 may be transmitted in SF1; RV2 may be transmitted in SF2; RV3 may be transmitted in SF3; and RV1 may be transmitted in SF4; all being redundant versions of the same transport block. It is noted that the retransmissions occur in a consecutive fashion, before any ACK or is received from the LTE network. In other words. TTI does not wait for a NACK before initiating a retransmission. The 3GPP's LTE specification specifies the sequence that the redundancy versions are transmitted. While each ITT bundle in FIG. 5A includes four subframes, a TTI bundle may include more or less subframes without departing from the scope of this disclosure.

In FIGS. 5A and 5B, when a scheduled ISM reception is indicated to the LTE-side in a LTE and ISM-enabled device, the LTE-side may complete an ongoing TTI bundle transmission if the coding rate of the data PUSCH transmission exceeds a threshold coding rate, $T_{CR}$. In this scenario, an ongoing TTI bundle transmission is one that is currently being transmitted. Here, the coding rate may represent the percent of data bits over the sum of data bits plus redundant bits, and a low coding rate may include more forward error correction (FEC) than a high coding rate. Example values for the threshold coding rate $T_{CR}$ include (but are not limited to) 1.0, 0.95, 0.9, 0.85, 0.8, 0.75. When the coding rate is high, and there is a low amount of FEC, the probability that the LTE network will receive a message is lower than when the coding rate is low. Because the examples illustrated in FIGS. 5A and 5B complete transmission of an ongoing TTI bundle when the coding rate is high, the likelihood of receiving a low probability message may increase because of the retransmissions inherent in the TTI bundles. Here, the coding rate may refer to the channel coding at stages 408, 416, 422, and/or 426 of FIGS. 4A and 4B.

FIG. 5B illustrates an example method for co-existence coordination between LTE data PUSCH transmission when TTI bundling is enabled and ISM reception. The method 500 begins at stage 510, where LTE TTI bundling is enabled and ISM reception priority (ISM_RX_PRIORITY) is asserted. At stage 520, it is determined whether a TTI buddle is under transmission. When a TTI bundle under transmission (YES), the method 500 proceeds to stage 530 where the PUSCH transmission coding rate is compared to a threshold coding rate $T_{CR}$. When an ongoing TTI bundle transmission is not detected at stage 520 (NO), the method 500 proceeds to stage 560 where transmission of the next TTI bundle is aborted. After stage 560, the method 500 advances to stage 570.

Returning to stage 530, when the coding rate exceeds the threshold coding rate $T_{CR}$ (YES), the method 500 advances to stage 550 where transmission of the TTI bundle may be allowed to proceed. On the other hand, when the coding rate does not exceed the threshold coding rate $T_{CR}$ at stage 530 (NO), the method 500 proceeds to stage 540 where the transmission of the TTI bundle is, aborted—i.e., transmission of any un-transmitted subframes of the TTI bundle is aborted. During the aborted TTI bundle, ISM-side transmission or reception by the UE can occur. Whether transmission of the ongoing TTI bundle is aborted at stage 540 or allowed to proceed at stage 550, the method 500 advances to stage 570.

At stage 570, it is determined whether ISM_RX_PRIORITY is de-asserted. When ISM_RX_PRIORITY remains asserted (NO), the method 500 returns to stage 560 where transmission of the next TTI bundle is aborted. When ISM_RX_PRIORITY is de-asserted at stage 570 (YES), the method 500 proceeds to stage 580 where the transmission of TTI bundles resumes. When ISM_RX_PRIORITY is de-asserted while transmission of a TTI bundle is being aborted, any subframes of the TTI bundle that have not been aborted may be transmitted after de-assertion of ISM_RX_PRIORITY (refer to the discussion of FIG. 5A, below, for an example of this scenario). The method 500 completes after stage 580—i.e., stage 590 (End).

Turning back to FIG. 5A, an example scenario where ISM_RX_PRIORITY is asserted during the transmission of TTI Bundle 1 is illustrated. In this example, ISM_RX_PRIORITY is asserted between the transmission of SF2 and SF3 of TTI Bundle 1. As should be apparent to a person of ordinary skill in the art, ISM_RX_PRIORITY may be asserted or de-asserted at any time, and between the transmission of any two subframes of a TTI bundle (e.g., SF1 and SF2, SF2 and SF3, or SF3 and SF4 of TTI Bundle 1), or between any two TTI bundles (e.g., TTI Bundle 2 and TTI Bundle 3). Because ISM_RX_PRIORITY is asserted during an ongoing transmission of TTI Bundle 1 (YES at stage 520 of FIG. 5B), the PUSCH transmission coding rate is compared to a threshold coding rate (stage 530 of FIG. 5B). If the coding rate exceeds the threshold coding rate (YES at stage 530 of FIG. 5B), transmission of SF3 and SF4 of TTI Bundle 1 may be allowed to proceed; otherwise (NO at stage 530 of FIG. 5B) transmission of SF3 and SF4 of TTI Bundle 1 may be aborted.

While ISM_RX_PRIORITY is asserted in the example scenario shown in FIG. 5A, TTI bundle transmission is aborted (NO, at stage 570 of FIG. 5B, and performance of stage 560 of FIG. 5B). In this example, transmission of TTI Bundle 2, TTI Bundle 3, and the subframes SF1 and SF2 of TTI Bundle 4 are aborted. Once ISM_RX_PRIORITY is de-asserted (YES at stage 570 of FIG. 5B), TTI bundle transmission is resumed (stage 580 of FIG. 5B). Because the ISM_RX_PRIORITY is de-asserted between the subframes SF2 and SF3 of the TTI Bundle 4, TTI bundle transmission will resume with the transmission of subframes SF3 and SF4 of the TTI Bundle 4 in this example. In FIGS. 5A and 5B, a TTI bundle whose transmission was aborted may be retransmitted at a later time. Further, aborting the transmission of a TTI bundle and the subsequent retransmission of the TTI bundle may be achieved as described in accordance with FIG. 4A or FIG. 4B.

Another scenario where co-existence coordination may be performed in a LTE and ISM-enabled device is during voice over IP (VoIP)/voice over LTE (VoLTE) service. VoIP/VoLTE traffic may be associated with the LTE semi-persistent (SPS) configuration and/or the TTI bundling configuration (described above). SPS is scheduling technique that may reduce the overhead associated with certain control information. Because VoIP/VoLTE traffic is delay sensitive, when ISM reception priority is asserted when VoIP/VoLTE is active, a LTE SPS data PUSCH transmission (or retransmission) may be aborted if subsequent retransmission would occur within an acceptable delay period (which may be defined by a delay tolerance $T_{SPS}$), and the maximum uplink transmission for the transport block has not been reached. The delay tolerance $T_{SPS}$ may be defined statically, and then dynamically adjusted based on various factors, such as measured uplink channel performance statistics (e.g., uplink HARQ ACK/NACK ratio). $T_{SPS}$ may be, e.g., 4 ms, 8 ms, 16 ms, 32 ms, etc. This technique may be implemented regardless of whether TTI bundling is configured.

Figure 6:
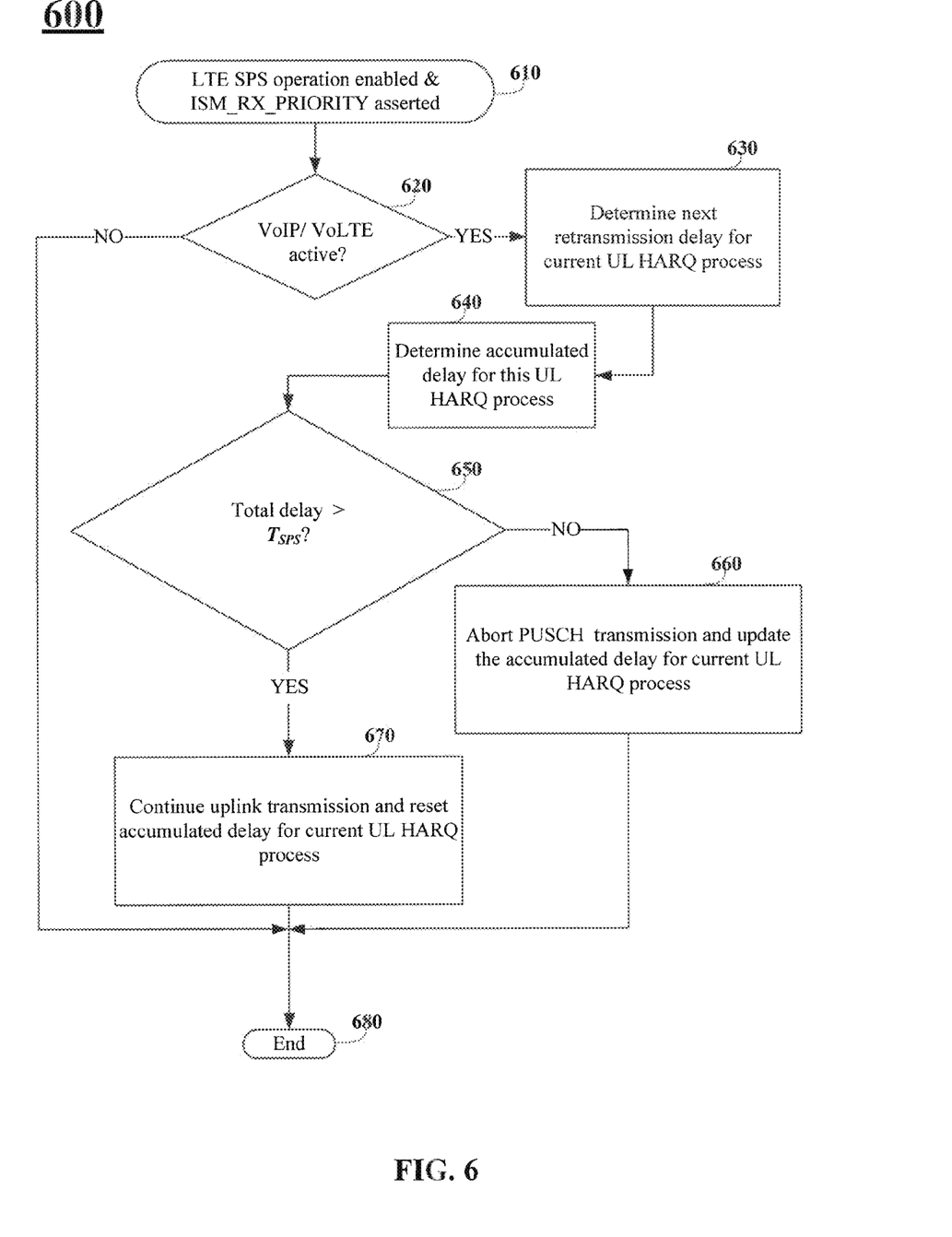
FIG. 6 illustrates an example method for co-existence coordination between LTE data PUSCH transmission when SPS is enabled and ISM reception.

FIG. 6 illustrates an example method 600 for co-existence coordination between LTE data PUSCH transmission when SPS is enabled and ISM reception. The method 600 begins at stage 610 where LTE SPS operation is enabled and ISM_RX_PRIORITY is been asserted. At stage 620, it is determined whether VoIP/VoLTE is active. When VoIP/VoLTE is not active (NO), the data PUSCH transmission may be allowed to proceed, and the method 600 advances to stage 680 and ends. When VoIP/VoLTE is active (YES) the method 600 proceeds to stage 630, where the amount of delay until the next retransmission for the current UL HARQ process is determined. After stage 630, the accumulated delay resulting from previously aborting one or more transmissions associated the current UL HARQ process is determined at stage 640. Thereafter, the process 600 advances to stage 650.

At stage 650, the total delay (i.e., the sum of the delay determined in stages 630 and 640) is determined and compared to the delay tolerance $T_{SPS}$. When the total delay exceeds the delay tolerance $T_{SPS}$ (YES), the data PUSCH transmission may be allowed to proceed, the value of the accumulated delay (stage 640) may be reset for the current UL HARQ process, and the method 600 completes at stage 680. When the total delay does not exceed the delay tolerance $T_{SPS}$ (NO) at stage 650, the PUSCH data transmission is aborted, the value of the accumulated delay (stage 640) is updated to account for the aborted transmission, and the method 600 completes at stage 680. During the aborted transmission, the ISM-side transmission or reception can occur.

Another scenario where co-existence coordination may be performed in a LTE and ISM-enabled device is during LTE PRACH transmission, which (as mentioned) may be used by the device to synchronize with an eNodeB of a LTE network. A LTE PRACH transmission may be triggered: due to a handover procedure (where a LTE-enabled device moves from one cell to another cell); due to a PDCCH order (as mentioned, PDCCH may carry certain control information from a LTE network to a LTE-enabled device); for an initial connection to a LTE network; for timing alignment; for an uplink grant request; and in other situations. Also, because a LTE PRACH transmission may be restricted to certain time and frequency resources, a LTE PRACH transmission may be delayed until the appropriate resources are available—i.e., until a PRACH transmission opportunity arises.

Figure 7:
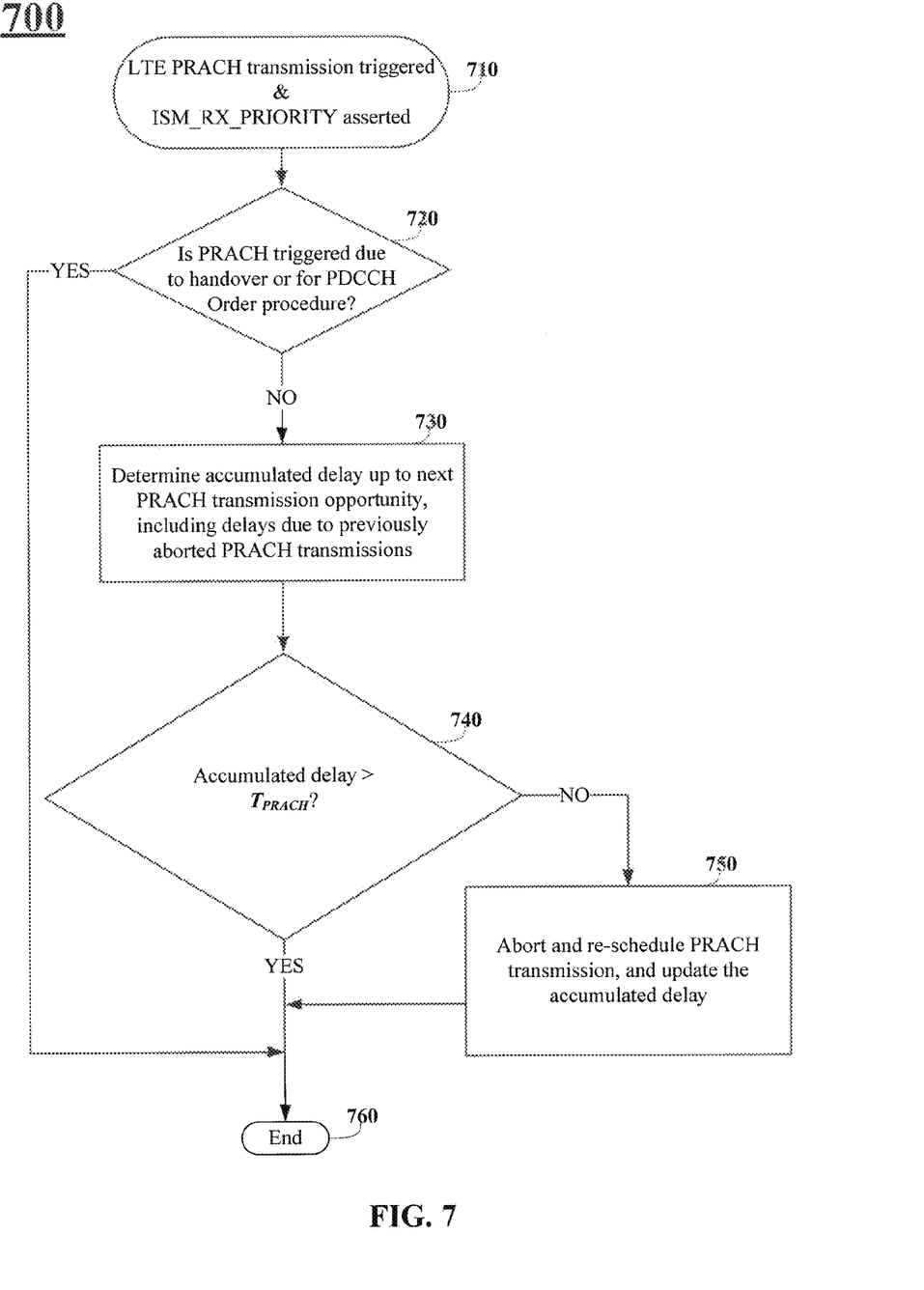
FIG. 7 illustrates an example method for co-existence coordination between LTE PRACH transmission and ISM reception.

FIG. 7 illustrates an example method 700 for co-existence coordination between LTE PRACH transmission and ISM reception. The method 700 begins at stage 710 where LTE PRACH transmission is triggered and ISM_RX_PRIORITY is asserted. At stage 720, it is determined whether the PRACH transmission was triggered due to handover or due to a PDCCH order. As mentioned, the PDCCH is one of several physical channels defined by the 3GPP LTE specification in the downlink direction—i.e., from the LTE network to the LTE-enabled device—and may carry certain control information from the LTE network to the LTE-enabled device. When the PRACH transmission is triggered due to either handover or because of a PDCCH order (YES), the PRACH transmission may be allowed to proceed and the method 700 ends at stage 760. However, when the PRACH transmission is not triggered due to handover or a PDCCH order (NO), the method 700 advances to stage 730.

At stage 730, the amount of delay from the last completed PRACH transmission until the next PRACH transmission opportunity is determined. Stated another way, the accumulated delay up to the next PRACH transmission opportunity, including delays due to any previously aborted PRACH transmission (since the last completed PRACH transmission) is calculated or determined. Thereafter, the method 700 advances to stage 740, where the accumulated delay is compared to threshold PRACH delay, $T_{PRACH}$. The threshold PRACH delay $T_{PRACH}$ may indicate the maximum amount of time a PRACH transmission may be delayed, and may be measured in milliseconds. $T_{PRACH}$ may be, e.g., 2 ms, 4 ms, 8 ms, 16 ms, 20 ms, etc. When the accumulated delay exceeds $T_{PRACH}$ (YES), the PRACH transmission may be allowed to proceed and the method 700 ends at stage 760. When the accumulated deal does not exceed $T_{PRACH}$ (NO), the method 700 advances to stage 750. At stage 750, the LTE PRACH transmission triggered at stage 710 is aborted, and rescheduled for later transmission, and the accumulated delay calculated at stage 730 is updated. After stage 750, the method 700 ends at stage 760. During the aborted, transmission, the ISM-side transmission or reception can occur.

Another scenario where co-existence coordination may be performed in a LTE and ISM-enabled device is during LTE PUCCH transmission. Various forms of uplink control information (UCI) may be transmitted on PUCCH resources. And, uplink control information may be transmitted on PUCCH resources using the PUCCH format that corresponds to the uplink control information that is being transmitted. TABLE I (below) maps uplink control information to a corresponding PUCCH format.

TABLE I

| PUCCH format | Uplink Control Information (UCI) |
|---|---|
| 1 | Scheduling Request (SR) |
| 1a | 1-bit ACK/NACK with or without SR |
| 1b | 2-bit ACK/NACK with or without SR |
| 2 | Channel State Information (CSI) |
| 2a | CSI + 1-bit ACK/NACK |
| 2b | CSI + 2-bit ACK/NACK |

A scheduling request (SR) may be used to report a LTE-enabled device's buffer status, and to request an uplink grant from a LTE network. Depending on the configuration applied by a LTE network, the periodicity of SR transmission may vary (e.g., 5 ms, 10 ms, 20 ms, 40 ms, 80 ms, etc.). In some network configurations, cancellation of a SR transmission—e.g., in order to accommodate an ISM reception—may add substantial delays to SR transmission. For example, in a network configured for SR transmission every 80 ms, cancellation of a single SR transmission may result in, at least, a 160 ms delay between two consecutive SR transmissions. Thus, when a scheduled ISM reception is indicated to the LTE-side, SR transmission may be delayed for a predetermined period of time. But, once that predetermined period of time has elapsed (e.g., a threshold SR delay, $T_{SR}$, has been exceeded), SR transmission may be allowed to proceed in order to limit the adverse impact to LTE uplink performance. A threshold SR delay, $T_{SR}$, may be measured in milliseconds. $T_{SR}$ may be, e.g., 5 ms, 10 ms, 20 ms, etc.

ACK/NACK, i.e., HARQ ACK/NACK, may be transmitted to indicate a successful PDSCH reception or to request retransmission of a PDSCH transmission from the LTE network. As mentioned, the PDSCH may carry data from the LTE network to the LTE-enabled device. Cancellation of a HARQ ACK/NACK transmission may result in retransmission of data from a LTE network, which may be redundant if the downlink PDSCH reception was successful. Thus, when a scheduled ISM reception is indicated to the LTE-side, HARQ NACK transmission may be canceled, but HARQ ACK transmission may be allowed to proceed in order to avoid redundant downlink retransmission from the LTE network.

Channel state information (CSI) may include CQI, PMI, and RI information. Depending on the reporting mode that is configured by a LTE network, a LTE-enabled device may periodically evaluate and report CSI information to the LTE network. Again, the periodicity of CSI transmission may vary depending on the configuration of a LTE network. Based on the reported CSI information, a LTE network may adapt the grant scheduling for a LTE-enabled device. When a scheduled ISM reception is indicated to the LTE side, the LTE side may abort a PUCCH periodic report transmission if the periodicity of PUCCH reporting is less than a threshold PUCCH periodicity, $T_{PUCCH}$. $T_{PUCCH}$ may be, e.g., 2 ms, 5 ms, 10 ms, 15 ms, etc.

In a scenario where transmission of a CSI report coincides with a PUSCH transmission, the CSI report may be multiplexed with the PUSCH transmission (e.g., stage 418 of FIG. 4A). In this scenario, when a scheduled ISM reception that is indicated to the LTE-side results in aborting the PUSCH transmission—which, as mentioned, may occur in the example methods depicted in FIGS. 4A, 4B, 5A, 5B, and 6 the multiplexed CSI report may be aborted as well.

Figure 8:
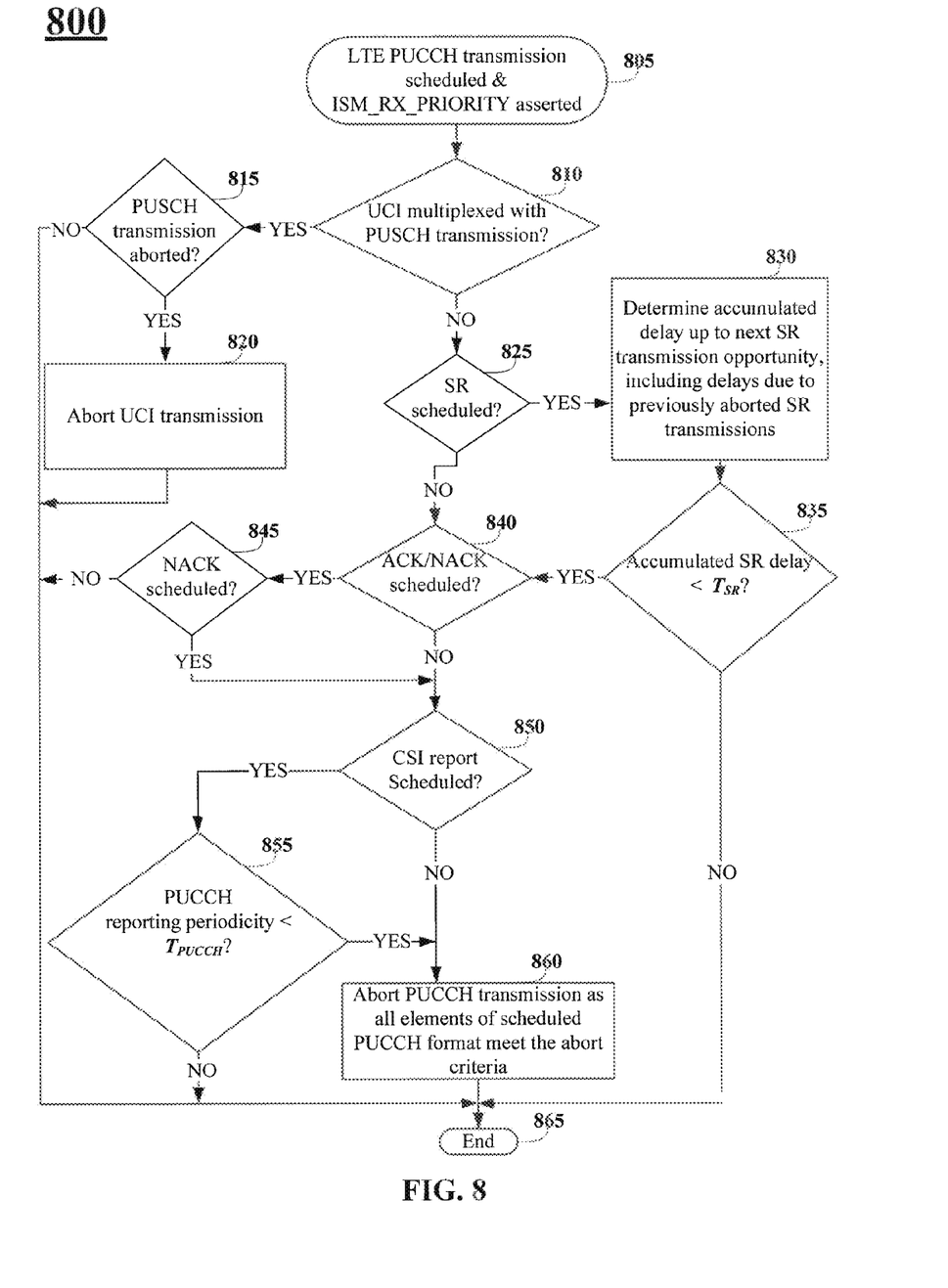
FIG. 8 illustrates an example method for co-existence coordination between LTE PUCCH transmission and ISM reception.

FIG. 8 illustrates an example method 800 for co-existence coordination between LTE PUCCH transmission and ISM reception. The method 800 begins at stage 805, where LTE PUCCH transmission is scheduled and ISM reception priority (ISM_RX_PRIORITY) is asserted. At stage 810, it is determined whether the uplink control information (UCI) is multiplexed with a PUSCH transmission. When the UCI is multiplexed with a PUSCH transmission (YES), the method 800 proceeds to stage 815 where it is determined whether the PUSCH transmission is aborted. When the PUSCH transmission is not aborted at stage 815 (NO), the PUCCH transmission may be allowed to proceed and the method 800 ends at stage 865. When the PUSCH transmission is aborted at stage 815 (YES), the transmission of the multiplexed UCI is also aborted at stage 820, and the method 800 ends at stage 865.

Returning to stage 810, when the UCI is not multiplexed with a PUSCH transmission (NO), the method 800 proceeds to stage 825 where it is determined whether SR transmission is scheduled. When SR transmission is not scheduled (NO), the method 800 advances to stage 840 (which, is described below). When SR transmission is scheduled (YES), the method 800 advances to stage 830. The amount of delay from the last SR transmission until the next SR transmission opportunity is determined at stage 830. Stated another way, the accumulated delay up to the next SR transmission opportunity, including delays due to any previously aborted SR transmission (since the last completed SR transmission) is calculated or determined. Thereafter, the method 800 advances to stage 835 where the accumulated SR delay is compared to a threshold SR delay $T_{SR}$. When the accumulated SR delay is not less than $T_{SR}$ (NO), the PUCCH transmission may be allowed to proceed and the method 800 ends at stage 865. When the accumulated SR delay is less than $T_{SR}$ (YES), the method 800 proceeds to stage 840.

At stage 840, it is determined whether ACK/NACK transmission is scheduled. When ACK/NACK transmission is not scheduled (NO), the method 800 advances to stage 850 (discussed below). When ACK/NACK transmission is scheduled (YES), the method 800 advances to stage 845 where it is determined whether NACK transmission is scheduled. When NACK transmission is not scheduled (i.e., ACK transmission is scheduled) at stage 845 (NO), the PUCCH transmission may be allowed to proceed and the method 800 ends at stage 865. When NACK transmission is scheduled (YES), the method 800 advances to stage 850 where it is determined whether a CSI report is scheduled. When a CSI report is not scheduled at stage 850 (NO), the PUCCH transmission is aborted at stage 860 and the method 800 ends at stage 865. When a CSI report is scheduled at stage 850 (YES), the method 800 proceeds to stage 855 where the PUCCH reporting periodicity is compared to a threshold PUCCH periodicity, $T_{PUCCH}$. When the PUCCH reporting periodicity is less than $T_{PUCCH}$ (YES), the method 800 advances to stage 860 where the PUCCH transmission is aborted. During the aborted transmission, the ISM-side transmission or reception can occur. When the PUCCH reporting periodicity is not less than $T_{PUCCH}$ (NO), the PUCCH transmission may be allowed to proceed and the method 800 ends at stage 865.

Another scenario where co-existence coordination may be performed in a LTE and ISM-enabled device is during LTE SRS transmission. A SRS may be transmitted on the last LTE symbol of the sub-frame in which it is scheduled. Because the duration, of SRS transmission is one LTE symbol, a scheduled SRS transmission may be allowed to complete when ISM reception priority is asserted. In this case, it is assumed that the transmission of one LTE symbol will not generate significant interference with ISM reception. Alternatively, the ISM-side (e.g., a ISM radio, or a processor that can control operation of an ISM radio, or both) may indicate to the LTE-side a maximum tolerable LTE interference duration, $T_{ISM}$. Here, the SRS transmission may only be allowed to proceed if the duration of the SRS transmission is less than $T_{ISM}$; otherwise the SRS transmission is aborted. $T_{ISM}$ may be, e.g., 2 ms, 5 ms, 10 ms, 15 ms, 20 ms, etc.

Figure 9:
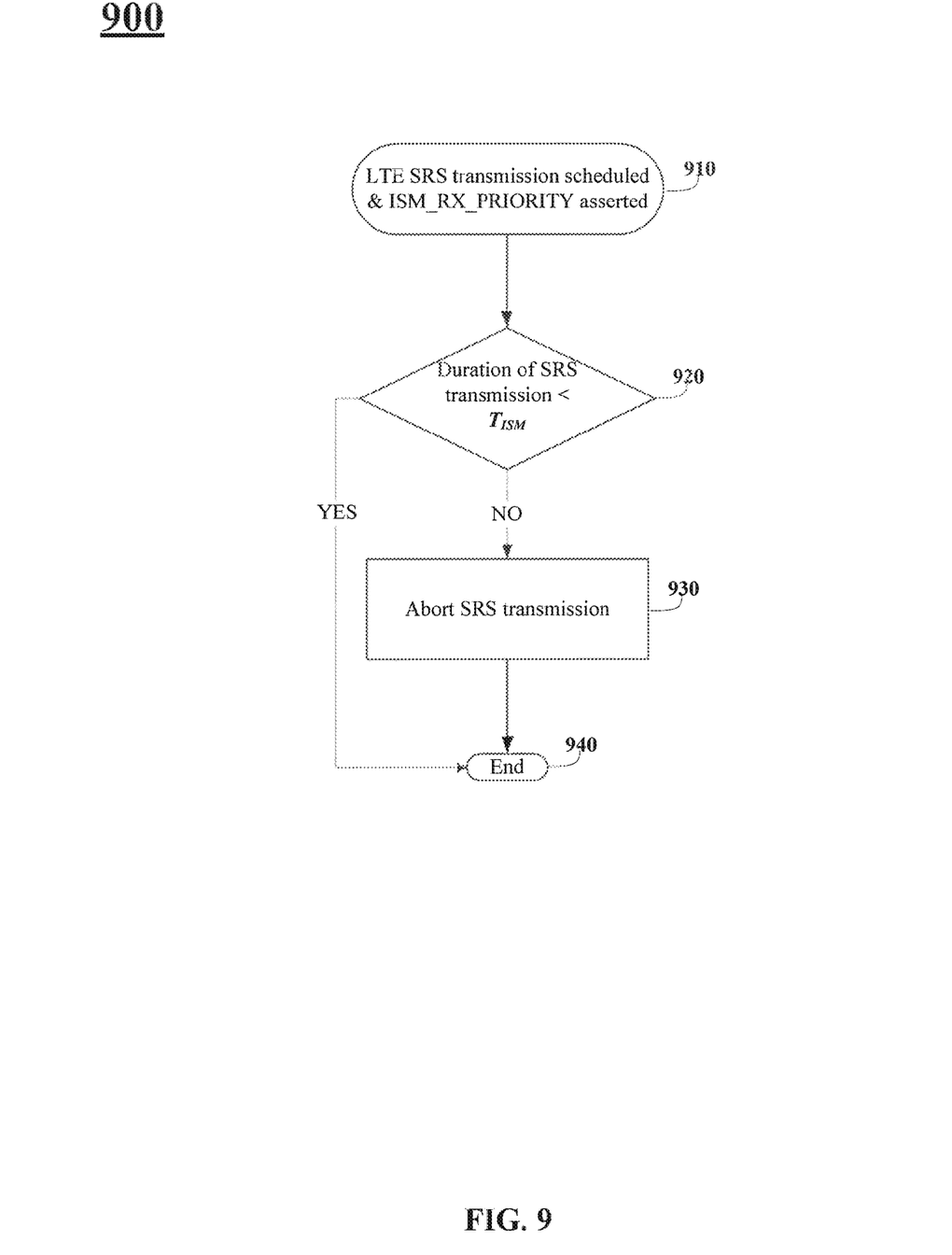
FIG. 9 illustrates an example method for co-existence coordination between LTE SRS transmission and ISM reception.

FIG. 9 illustrates an example method 900 for co-existence coordination between LTE SRS transmission and ISM reception. The method 900 begins at stage 910, where a LTE SRS transmission is scheduled and ISM reception priority is asserted. At stage 920, it is determined whether the duration of the SRS transmission is less than a maximum tolerable LTE interference duration, $T_{ISM}$. When the duration of the SRS transmission is less than $T_{ISM}$ (YES), the SRS transmission may be allowed to proceed and the method 900 ends at stage 940. When the duration of the SRS transmission is not less than $T_{ISM}$ (NO), the SRS transmission is aborted and the method 900 ends at stage 940.

CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be, appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

What is claimed is:

1. An apparatus comprising:
   a first radio configured to operate in at least a first frequency band;
   a second radio configured to operate in at least a second frequency band adjacent to the first frequency band and to operate in compliance with one or more long-term evolution (LTE) specifications; and
   a controller configured to request priority for reception at the first radio over transmission from the second radio, wherein the second radio is further configured to abort transmission when the priority is requested and transmission abort criteria is satisfied, wherein the transmission abort criteria is associated with a physical uplink shared channel (PUSCH) transmission defined in the one or more LTE specifications, and wherein arrival of a transport block or completion of channel coding satisfies the transmission abort criteria.

2. The apparatus of claim 1, wherein the controller is disposed in the first radio.

3. The apparatus of claim 1, further comprising:
a second controller disposed in the second radio, and configured to abort transmission from the second radio when the priority is requested and the transmission abort criteria is satisfied.

4. The apparatus of claim 1, wherein the first radio is configured to operate in at least an industrial, scientific and medical (ISM) frequency band.

5. The apparatus of claim 1, wherein the transmission abort criteria comprises a coding rate threshold, and the transmission abort criteria is satisfied when a coding rate of a data PUSCH transmission applying transmission time interval (TTI) bundling is below the coding rate threshold.

6. The apparatus of claim 1, wherein the transmission abort criteria comprises a delay threshold, and the transmission abort criteria is satisfied when retransmission of an aborted data PUSCH transmission applying semi-persistent scheduling (SPS) is below the delay threshold.

7. A method for avoiding interference in an apparatus configured for wireless communication, the method comprising:
scheduling reception at a first radio configured to operate in at least a first frequency band;
requesting priority for reception at the first radio over transmission by a second radio configured to operate in a second frequency band adjacent to the first frequency band and to operate in compliance with one or more long-term evolution (LTE) specifications; and
aborting transmission from the second radio when priority is requested and transmission abort criteria is satisfied, wherein the transmission abort criteria is associated with a physical uplink shared channel (PUSCH) transmission of the one or more LTE specifications, and wherein arrival of a transport block or completion of channel coding satisfies the transmission abort criteria.

8. The method of claim 7, further comprising:
conducting the scheduled reception at the first radio after aborting transmission from the second radio.

9. The method of claim 7, wherein the transmission abort criteria comprises a coding rate threshold, and the transmission abort criteria is satisfied when a coding rate of a data PUSCH transmission applying transmission time interval (TTI) bundling is below the coding rate threshold.

10. The method of claim 7, wherein the transmission abort criteria comprises a delay threshold, and the transmission abort criteria is satisfied when retransmission of an aborted data PUSCH transmission applying semi-persistent scheduling (SPS) is below the delay threshold.

11. A non-transient computer-readable medium comprising computer-readable instructions, which when executed by a controller cause the controller to perform operations comprising:
scheduling reception at a first radio configured to operate in at least a first frequency band;
requesting priority for reception at the first radio over transmission by a second radio configured to operate in at least a second frequency band adjacent to the first frequency band and to operate in compliance with one or more long-term evolution (LTE) specifications; and
aborting transmission from the second radio when priority is requested and transmission abort criteria is satisfied, wherein the transmission abort criteria is associated with a physical uplink shared channel (PUSCH) transmission of the one or more LTE specifications, and wherein arrival of a transport block or completion of channel coding satisfies the transmission abort criteria.

12. The non-transient computer-readable medium of claim 11, the operations further comprising:
conducting the scheduled reception at the first radio after aborting transmission from the second radio.

13. The non-transient computer-readable medium of claim 11, wherein the transmission abort criteria comprises a coding rate threshold, and the transmission abort criteria is satisfied when a coding rate of a data PUSCH transmission applying transmission time interval (TTI) bundling is below the coding rate threshold.

14. The non-transient computer-readable medium of claim 11, wherein the transmission abort criteria comprises a delay threshold, and the transmission abort criteria is satisfied when retransmission of an aborted data PUSCH transmission applying semi-persistent scheduling (SPS) is below the delay threshold.

15. The non-transient computer-readable medium of claim 11, wherein the first radio is further configured to operate in at least an industrial, scientific and medical (ISM) frequency band.

* * * * *